US010569507B2

(12) United States Patent
Wilenski et al.

(10) Patent No.: US 10,569,507 B2
(45) Date of Patent: Feb. 25, 2020

(54) KINETIC ENERGY ABSORPTION METHOD AND ABSORPTIVE COMPOSITE ARTICLE

(71) Applicant: The Boeing Company, Chicago, IL (US)

(72) Inventors: Mark S. Wilenski, Mercer Island, WA (US); Michael P. Kozar, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/904,962

(22) Filed: Feb. 26, 2018

(65) Prior Publication Data
US 2019/0263091 A1 Aug. 29, 2019

(51) Int. Cl.
B32B 7/00 (2019.01)
B32B 7/03 (2019.01)
B32B 5/14 (2006.01)
B32B 7/04 (2019.01)
B29C 70/20 (2006.01)
B29C 70/54 (2006.01)
B64D 37/32 (2006.01)

(52) U.S. Cl.
CPC .............. B32B 7/03 (2019.01); B29C 70/202 (2013.01); B29C 70/545 (2013.01); B32B 5/142 (2013.01); B32B 7/04 (2013.01); B32B 2307/56 (2013.01); B32B 2605/00 (2013.01); B64D 37/32 (2013.01); B64D 2037/325 (2013.01)

(58) Field of Classification Search
CPC ....................................... B32B 5/12
USPC ........................................ 428/114
See application file for complete search history.

(56) References Cited

U.S. PATENT DOCUMENTS

| 2010/0028593 | A1 | 2/2010 | Taketa et al. |
| 2015/0198520 | A1 | 7/2015 | Slocum et al. |
| 2016/0347918 | A1* | 12/2016 | Le ............................ C08J 5/042 |
| 2017/0144818 | A1 | 5/2017 | Wilenski et al. |

FOREIGN PATENT DOCUMENTS

GB          2438715 A       12/2007

OTHER PUBLICATIONS

European Patent Office; Extended European Search Report; European Patent Application No. 19150419.0; dated Jul. 19, 2019.

* cited by examiner

Primary Examiner — Brent T O'Hern
(74) Attorney, Agent, or Firm — Parsons Behle & Latimer

(57) ABSTRACT

A kinetic energy absorptive composite article includes a ply containing multiple substantially parallel fibers having inherent failure strains and having inherent moduli. A matrix material at least partially encapsulates the ply. The ply includes multiple lower strength length portions or multiple lower modulus length portions. The multiple lower strength length portions are distributed along individual fibers of the multiple fibers and have failure strains less than the inherent failure strains. The multiple lower modulus length portions are distributed along individual fibers of the multiple fibers and have moduli less than the inherent moduli. A designated pattern of the lower strength length portions or of the lower modulus length portions is distributed to selected locations identified in the ply. An absorptive method includes distributing a load across the designated pattern when the ply receives a force from kinetic energy.

20 Claims, 7 Drawing Sheets

KINETIC ENERGY ABSORPTION METHOD AND ABSORPTIVE COMPOSITE ARTICLE

BACKGROUND

Aircraft, spacecraft, and other structures may be impacted by various foreign objects. Examples include debris (such as tire treads, rocks, etc.), hail, micrometeoroids, etc. Breach of the structure could significantly damage internal components and effect structural integrity, even resulting in catastrophic loss of aircraft, spacecraft and other vehicular structures.

Aircraft, spacecraft, and other vehicular structures that carry fuel may experience a breach of fuel containment during a ground impact. A variety of self-sealing fuel bladders and impact containment structures exist with the goal of resisting breach of fuel containment during such events. Known fuel bladders and containment structures designed with such goals in mind are often made of either fabrics or unidirectional fibers. However, a desire exists to reduce the mass of fuel bladders and containment structures while still providing the same breach resistance or increasing breach resistance.

Accordingly, it will be appreciated that more efficient materials to reduce breach of structures would be beneficial for aircraft, spacecraft, and other vehicular structures subject to impact by foreign objects. More efficient materials exhibit a higher specific strength (strength/density), sometimes referred to as the strength-to-weight ratio. Similarly, more efficient breach resistant fuel bladders and containment structures would be beneficial. Materials with higher efficiency maintain or increase resistance to breach with less mass of the structural material compared to known structural materials.

SUMMARY

A kinetic energy absorption method includes providing a composite article including a ply containing multiple substantially parallel fibers having inherent failure strains and having inherent moduli. A matrix material at least partially encapsulates the ply. The ply includes multiple lower strength length portions or multiple lower modulus length portions. The multiple lower strength length portions are distributed along individual fibers of the multiple fibers and have failure strains less than the inherent failure strains. The multiple lower modulus length portions are distributed along individual fibers of the multiple fibers and have moduli less than the inherent moduli. A designated pattern of the lower strength length portions or of the lower modulus length portions is distributed to selected locations identified in the ply. The method includes distributing a load across the designated pattern when the ply receives a force from kinetic energy above a separation threshold. The load distribution includes plastically deforming the ply and the matrix material and separating the multiple fibers at the lower strength length portions or plastically stretching the multiple fibers at the lower modulus length portions. The load distribution also includes creating gaps in the ply where the multiple fibers are separated or creating shear boundaries in the ply where the multiple fibers are plastically stretched.

A kinetic energy absorptive composite article includes a ply containing multiple substantially parallel fibers and a matrix material at least partially encapsulating the ply. Multiple lower strength length portions are distributed along each individual fiber of the multiple fibers or multiple lower modulus length portions are distributed along each individual fiber of the multiple fibers. The composite article includes multiple higher strength length portions or multiple higher modulus length portions. Multiple higher strength length portions are distributed along each individual fiber of the multiple fibers, the higher strength length portions of individual fibers being defined by and extending between two respective lower strength length portions of the same fiber and the lower strength length portions having failure strains less than a failure strain of the higher strength length portions that is the same among the higher strength length portions. Multiple higher modulus length portions are distributed along each individual fiber of the multiple fibers, the higher modulus length portions being defined by and extending between two respective lower modulus length portions of the same fiber and the lower modulus length portions having moduli less than a modulus of the higher modulus length portions that is the same among the higher modulus length portions. A designated pattern of the lower strength length portions or of the lower modulus length portions is distributed to selected locations identified in the ply. A corresponding designated pattern of the higher strength length portions or of the higher modulus length portions is defined by the designated pattern of the lower strength length portions or of the lower modulus length portions.

A kinetic energy absorptive composite article includes a ply containing multiple substantially parallel fibers and a matrix material at least partially encapsulating the ply and at least partially joining together the multiple fibers into joined fibers. A first lower strength length portion of the joined fibers or a first lower modulus length portion of the joined fibers is at a selected first location identified in the ply. A second lower strength length portion of the joined fibers or a second lower modulus length portion of the joined fibers is at a selected second location identified in the ply and separated from the first location. A higher strength length portion of the joined fibers or a higher modulus length portion of the joined fibers extends from the first location to the second location. The higher strength length portion has a failure strain greater than respective failure strains of both the first and second lower strength length portions, or the higher modulus length portion has a modulus greater than respective moduli of both the first and second lower modulus length portions.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

Some embodiments are described below with reference to the following accompanying drawings.

DETAILED DESCRIPTION

Figure 1:
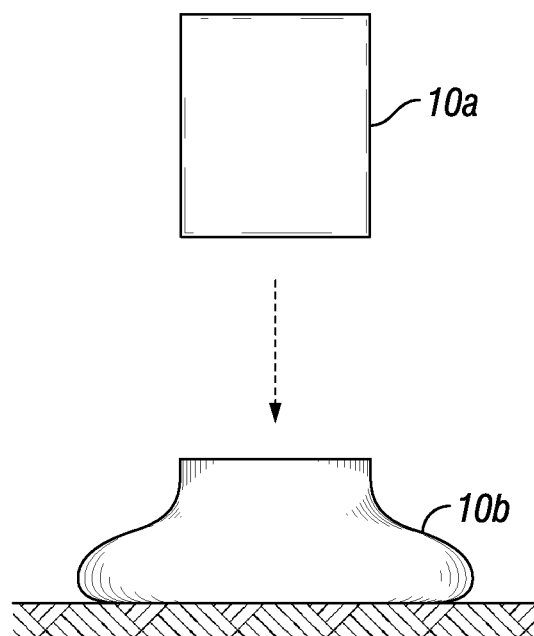
FIG. 1 shows a side view of a fuel bladder and its impact with the ground.

Known containment structures may stop foreign objects from breaching the structure as a result of several mechanisms, including absorbing energy through fiber failure, through shearing between the layers (delaminations), and through damage to the foreign object. The location and extent of these mechanisms is not specifically designed into known containment structures, resulting in a containment structure that weighs more than necessary. Without implementing known failure mechanisms by design, the mechanisms are not invoked at the most efficient location and/or time during an impact event and do not absorb energy in the most efficient manner.

Often, known containment structures are made using mostly composites with a single type of fiber in a simple cross-plied layup. The described several mechanisms may occur in such layups during impact by a foreign object, but the extent to which the mechanisms occur and their location are not controlled. The methods and apparatuses described herein permit design of a containment structure using composite plies strategically weakened in designated locations and/or patterns to absorb more energy per unit mass, increasing material efficiency in comparison to known containment structures. Such composite plies invoke desirable mechanisms and control such mechanisms in a manner that absorbs more kinetic energy.

Creating weakened portions or discontinuities in one or more fibers in a designated pattern in a ply allows a composite containing the ply to fail along lines determined by the pattern. Also, the load may be distributed more broadly, allowing more fiber to pull out of the resin as a mechanism to absorb more kinetic energy. Multiple plies may be weakened to distribute such effects through the composite thickness.

A backside ply or backside layer containing multiple plies that are not breached, may be included in the composite. A foreign object may first strike a frontside ply or frontside layer containing multiple plies, absorbing some energy and creating a volume of delaminated composite. The backside ply or plies that are not breached may catch the foreign object or catch the foreign object along with the volume of delaminated composite.

As a result, materials with higher efficiency maintain or increase resistance to breach by directing failure along predetermined paths. The described increased control over failure mode occurs without adding weight to a composite article compared to known composite particles lacking such control. The methods and apparatuses herein force failure of the composite material to occur broadly, causing more composite material to be involved in an impact event.

The control may be implemented by degrading selected portions or regions of composite material using at least one process selected from among thermal, chemical, irradiation, and mechanical processes. One thermal process includes applying a laser to overheat the composite material in a pattern. One chemical process includes locally weakening the fibers, the matrix material, or both. One radiation process uses an ultraviolet source to cause chain scission to weaken fibers and/or matrix material in a local pattern. Mechanical processes may include partially cutting through fibers and/or matrix material or completing cutting through fibers.

During a ground impact event, liquid fuel in a fuel bladder produces a hydrodynamic ram that may cause fibers to undergo very sharp impulse loading, potentially causing failure of the bladder wall. Known bladders have been very robustly designed to overcome a failure, but robustly designed bladder walls are heavy. FIG. 1 shows a fuel bladder 10a falling to the ground and distorting on impact to yield an impacted fuel bladder 10b. Distortion of the walls in impacted fuel bladder 10b shows one example of the impulse loading that fibers undergo from the hydrodynamic ram caused by contained fuel. Impact containment structures surrounding fuel bladders may be provided and similarly designed very robustly to meet performance criteria for an impact.

A robust design might include very tough materials, such as KEVLAR or other synthetic fibers, and also may be heavy in keeping with the robust design. The methods and apparatuses described herein allow load distribution and selective fiber failure as a mechanism for absorbing the kinetic energy applied by an impulse due to a ground impact. As such, the peak load on individual fibers may be reduced, allowing structure walls to be more efficiently designed and resulting in a lighter structure while maintaining performance. The same concept permits design of structures subject to impact by foreign objects, such that kinetic energy of objects may be absorbed and the peak load on individual fibers reduced compared to known structures. In addition to fuel bladders and impact containment structures, any other component of aircraft, spacecraft, and other vehicular structures subject to ground impact or impact by foreign objects may be amenable to the methods and apparatuses described herein.

Planned destructive mechanisms, such as lower strength and/or lower modulus length portions of fibers, constitutes one design feature to assist with such objectives. Other assistive design features are described herein. By making at least some of the fibers weaker and/or more easily stretched, load may be distributed to regions of a composite not normally affected or not affected as much during an impact event. As a result, targeted delamination of a composite and selective shearing of some fibers, and possibly some matrix, can enable kinetic energy absorption without breach.

Figure 2:
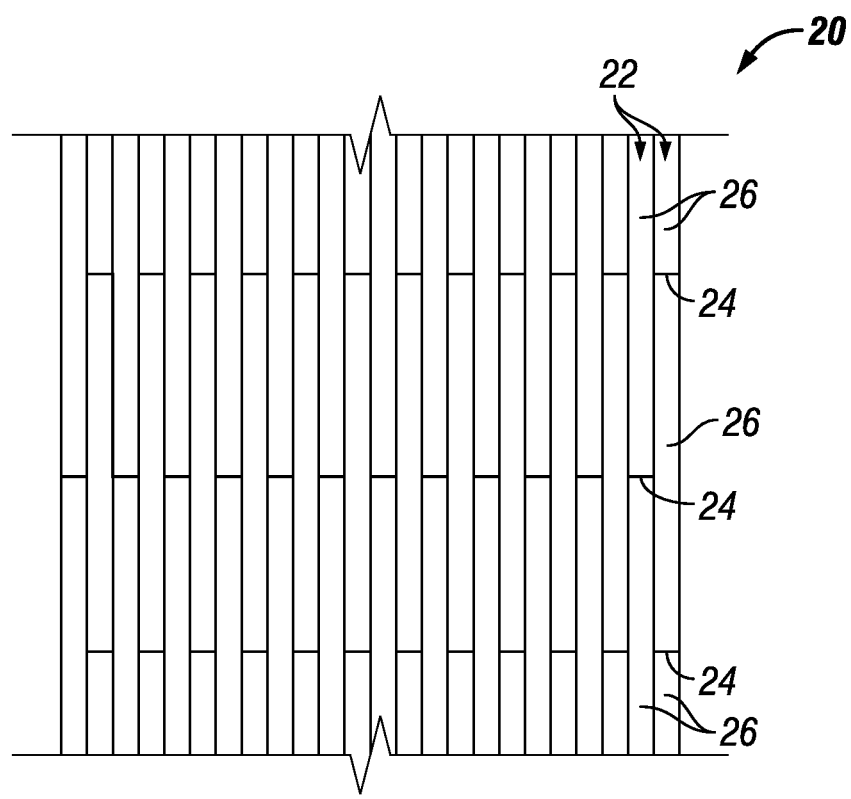
FIG. 2 shows a top view of a composite ply.

FIG. 2 shows a top view of a ply of composite material before loading when no fiber stress is applied from a kinetic impulse. Matrix material that would be present in interstitial spaces between fibers is not represented in FIG. 2 for simplicity, but would normally at least partially encapsulate the fibers in ply 20. Ply 20 includes multiple substantially parallel fibers having inherent failure strains determined by their composition and/or manufacturing method. Failure strain is the engineering (i.e., nominal) strain at which a material fails. Examples of known fiber materials includes nylon, polyethylene, aramid (e.g. KEVLAR), POM (polyoxymethylene, e.g. DELRIN), PTFE (polytetrafluoroethylene, e.g. TEFLON); PEEK (polyetheretherketone), polyesters (such as, PET (polyethylene terephthalate) and others), PP (polypropylene), and PVA (polyvinyl alcohol). Others are known as well. It will be appreciated from the discussion herein that a substantially parallel route might deviate in a de minimis amount from a perfectly parallel route while still providing the benefits of the methods and apparatuses described herein.

Two structures are designated in ply 20 as fibers 22. It will be appreciated that fibers 22 may represent two individual fibers. Fibers 22 may instead represent two parallel groups of individual fibers with group members joined together with matrix material to provide the FIG. 2 structure. Fibers 22 include lower strength length portions 24 designating the part of the lengths of fibers 22 that are weakened or discontinuous. The length of lower strength length portions 24 in FIG. 2 are very short as may exist when fibers are simply cut at a designated location. However, weakening of fibers 22 may occur over a longer fiber portion when fiber degradations include thermal, chemical, irradiation or other degradations.

Fibers 22 also include higher strength length portions 26 representing unmodified portions of fibers 22 exhibiting their inherent failure strain. Since the structures designated as fibers 22 in FIG. 2 may be individual fibers, or groups of fibers joined together by matrix material, it will be appreciated that lower strength length portions 24 may be on a single fiber or aligned across multiple fibers.

Figure 7:
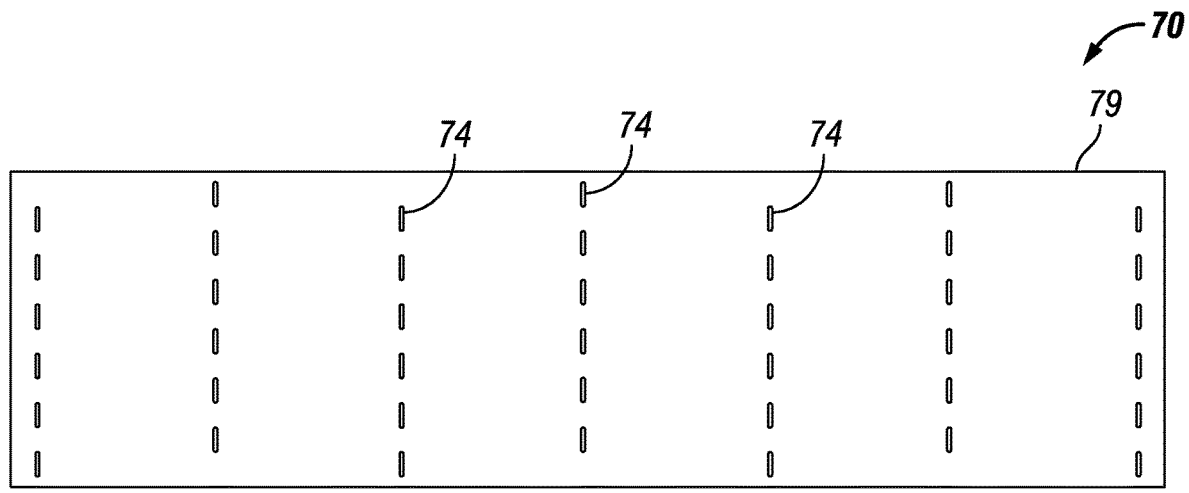
FIG. 7 is a top view of a composite ply.

The vertical lines designating individual fibers or groups of fibers in FIG. 2 would not necessarily be readily identifiable in an actual composite ply. FIG. 7 is a truer representation of how a composite ply might appear in practice when fibers are degraded by cutting. Fibers degraded by thermal, chemical, irradiation, or other processes might not necessarily appear any different in lower strength length portions 24 compared to higher strength length portions 26. Consequently, length portions 24 designated in FIG. 2 might not be identifiable in practice. It will be appreciated that boundaries identifying fibers 22 in FIG. 2 are for convenience to perceive the fibers or groups of fibers affected by a given degradation in lower strength length portions 24.

Figure 3:
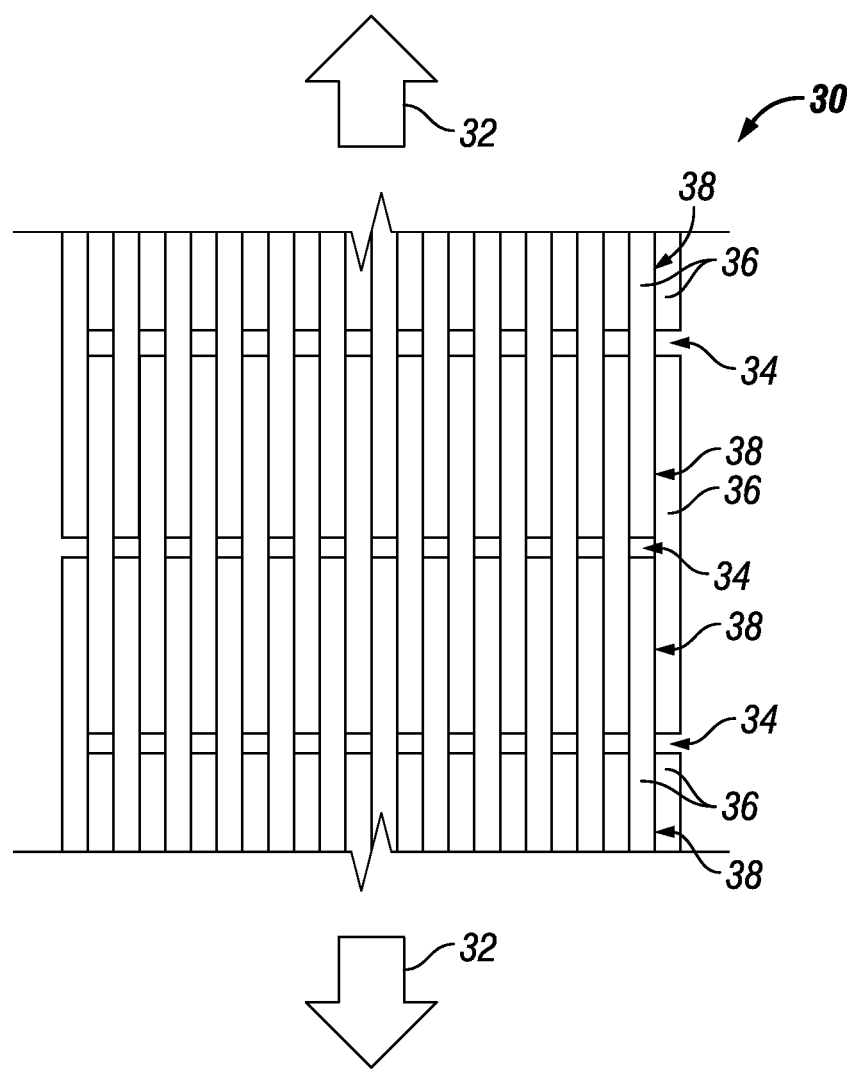
FIG. 3 shows a top view of the composite ply in FIG. 2 after tensile loading.

FIG. 3 shows a ply 30 representing ply 20 of FIG. 2 after tensile loading along directions identified by arrow 32. Fibers 22 of FIG. 2, whether taken individually or as groups of fibers, are separated in FIG. 3, creating gaps 34 in ply 30 where lower strength length portions 24 are separated. Gaps 34 separate across a longitudinal direction of fibers 22 shown in FIG. 2 to form separated segments 36 extending between gaps 34 in FIG. 3. In another failure mode not shown in FIG. 3, gaps may separate along a longitudinal direction of the fibers, instead of across a longitudinal direction, to form split ribbons from the lower strength portions. The fibers thus may split into multiple strands or ribbons, helping to reduce wedging failure wherein an object wedges between fibers.

Segments 36 may be individual fibers or include a group of fibers joined together by matrix material. FIG. 3 also shows shear boundaries 38 formed between segments 36 as gaps 34 open during tensile loading. It will be appreciated that additional shear boundaries not represented in FIG. 3 may exist. However, FIG. 3 shows shear boundaries 38 arising with movement of segments 36 during tensile loading.

Shear between individual pieces of pre-impregnated composite, such as segments 36, may enable absorption of kinetic energy over time. The separation threshold for a force causing such shear may be controlled by the composition and/or manufacturing processes for matrix material, any adhesive or release material between plies, and the pattern selected for locating lower strength length portions 24. Such controls allow a reduction in peak hydrodynamic pressure for a fuel bladder in a ground impact event or distribution of impact force for more gradual deceleration of an impacting object. Shear boundaries in FIG. 3 are also shown only between segments 36 and not between other plies that would exist in an actual composite structure. Examples of known matrix materials include thermoplastics, including thermoplastic polyurethanes, and thermosets, including polyesters, epoxies, and rubber-like materials (lightly cross-linked, like neoprene), silicones, etc. Others are known as well.

Below the threshold, no permanent deformation of the article occurs. Aircraft, spacecraft and other vehicular structures endure a wide variety of forces with no permanent deformation. The methods and apparatuses herein do not necessarily change the ability to endure such forces, instead changing the nature of deformation beyond the threshold from a breach of the structure to absorption of higher levels of kinetic energy.

In another failure mode not shown in FIG. 3, lower modulus length portions (not shown) may be used instead of all or some of lower strength length portions 24. Lower modulus length portions could be designated in FIGS. 2 and 3 in the same manner as lower strength length portions 24 discussed above. FIGS. 2 and 3 would otherwise be the same, except as indicated below, when including lower modulus length portions.

Lower modulus length portions would be the part of the lengths of fibers 22 with lower moduli compared to an inherent modulus of fibers 22. Lower modulus length portions may be provided by fiber degradations that include thermal, chemical, irradiation or other degradations. While similar in concept to lower strength length portions, lower modulus length portions do not necessarily have lower strength, though they could, and do not involve a discontinuity, as when cutting fiber.

Fibers 22 would include higher modulus length portions (not shown) representing unmodified portions of fibers 22 exhibiting their inherent modulus, analogous to higher strength length portions 26 in FIG. 2. Since the structures designated as fibers 22 in FIG. 2 may be individual fibers, or groups of fibers joined together by matrix material, it will be appreciated that lower modulus length portions may be on a single fiber or aligned across multiple fibers.

FIG. 3 shows gaps 34 in ply 30 where lower strength length portions 24 are separated. In the event that lower modulus length portions exist in fibers 22, gaps 34 would not necessarily be created after tensile loading along directions identified by arrow 32, although gaps might be created. With the differential in modulus along fibers, the lower modulus length portions are more likely to elastically deform under a distributed load from kinetic energy. As the lower modulus length portions preferentially stretch elastically under load, they eventually reach their yield strength and begin to stretch plastically until they fail. That failure, if it occurs, and both types of stretching processes absorb energy. Fiber failure creates gaps, such as gaps 34.

At least when stretching plastically, and possibly when stretching elastically, shear boundaries may form, as shown with shear boundaries 38 in FIG. 3, depending on properties of the composite, as discussed below. It will be appreciated that additional shear boundaries not represented in FIG. 3 may exist. However, FIG. 3 shows shear boundaries 38 arising with movement of segments 36 during tensile loading. Similar shear boundaries may occur with movement of higher modulus length portions when stretching lower modulus length portions.

Figure 4:
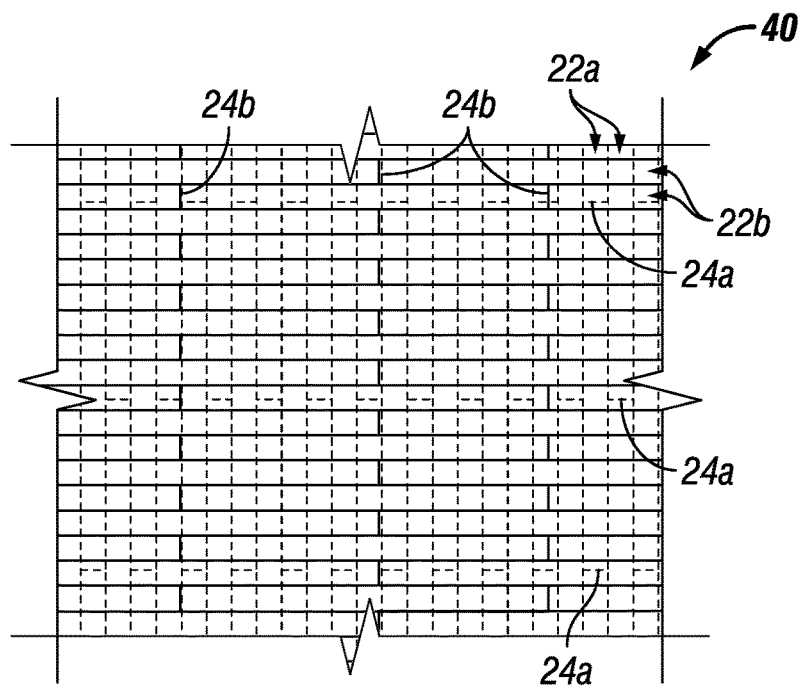
FIG. 4 shows a top view of two composite plies.

FIG. 4 shows a top view of two of plies 20 from FIG. 2 overlaid with the top ply rotated 90 degrees as would exist with a cross ply. Methods and apparatuses herein may include plies at other angles, such as 10°, 30°, 45°, 60°, etc. but are not shown for simplicity. For example, one or more plies of 10° fibers may be included. In another method or apparatus, one or more plies of 30° fibers may be included. In yet another method or apparatus, one or more plies of 60° fibers may be included.

In FIG. 4, fibers or fiber groups in the bottom ply in the orientation shown in FIG. 2 are represented as fibers 22a with hidden lines. Fibers or fiber groups in the top ply in a 90° orientation are represented as fibers 22b. Only two of the respective fibers are identified by reference numeral for simplicity. Corresponding lower strength length portions 24a are shown with hidden lines for fibers 22a and lower strength length portions 24b are shown for fibers 22b. Higher strength length portions such as those identified with reference numeral 26 in FIG. 2 are not identified in FIG. 4 merely for simplicity, but are present, as appreciated from the description pertaining to FIG. 2.

Figure 5:
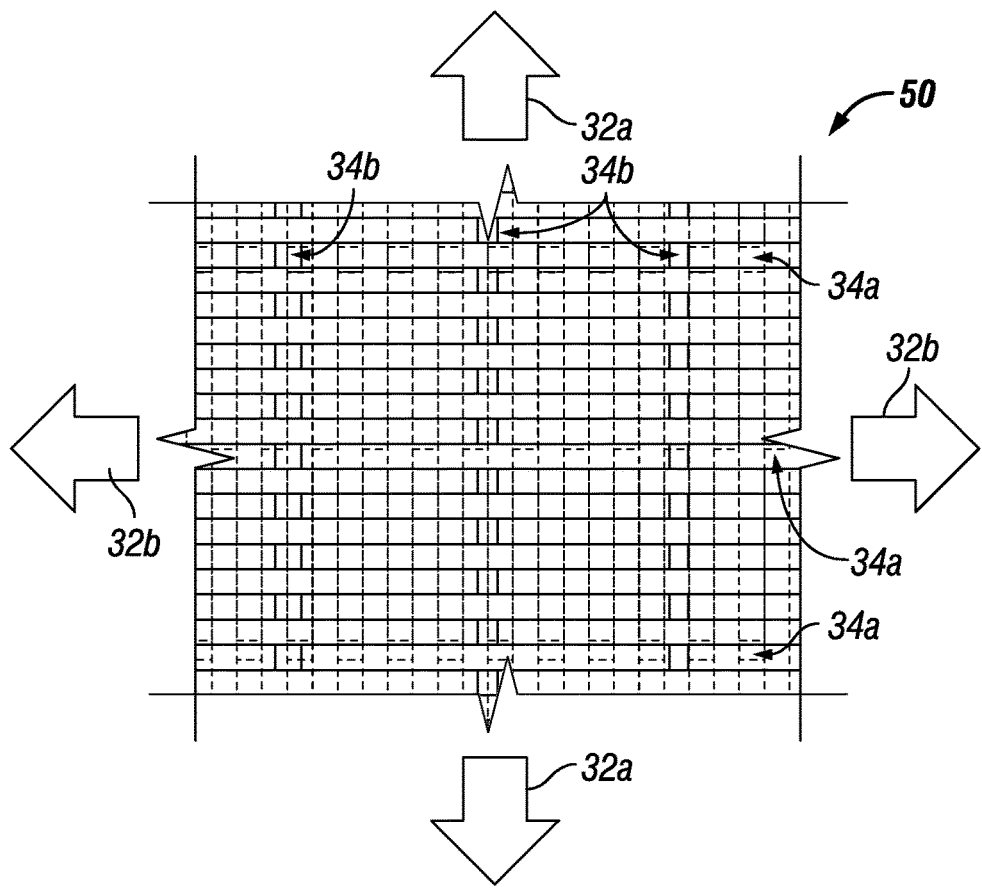
FIG. 5 shows a top view of the two composite plies in FIG. 4 after multi-axial tensile loading.

FIG. 5 shows multi-axial tensile loading along directions identified by arrow 32a (as in FIG. 3) and arrow 32b. FIG. 5 shows plies 40 of FIG. 4 represented as plies 50 after multi-axial tensile loading. Gaps 34a arising at lower strength length portions 24a of FIG. 4 are shown in FIG. 5. Gaps 34b arising at locations of lower strength length portions 24b from FIG. 4 are shown. It will be appreciated from the discussion regarding FIG. 3 that segments, such as segments 36, will exist in plies 50 after multi-axial tensile loading, but are not identified with reference numerals, for simplicity. Such segments are readily identifiable from the shear boundaries in FIG. 5 identifiable by analogy to FIG. 3.

Thus, in a composite with multiple plies at different angles, shear may also occur in plane between plies, absorbing energy additional to that identified by shear boundaries between segments. Similar to the discussion for FIG. 3, the separation threshold allowing a force to cause shear may be controlled by the matrix material composition and/or manufacturing process, any adhesive or release material between plies, and the patterning of lower strength length portions.

Lower modulus length portions (not shown) may be used instead of all or some of the lower strength length portions in FIGS. 4 and 5 in an analogous manner to that discussed above with regard to FIGS. 2 and 3.

The distributed loading in FIGS. 2-5 may be realized when a fuel bladder containing liquid impacts the ground, as in FIG. 1. The liquid pushes against the sidewalls of the bladder, causing outward pressure at the bottom of the bladder. In a relatively stiff bladder, the outward pressure at the bottom of the bladder rises rapidly and can cause failure of the bladder due to the high mechanical load. To mitigate failure in such circumstances, the kinetic energy of the outward pressure could be absorbed within the bladder walls during deformation using distributed loading, such as in FIGS. 3 and 5. The outward pressure separates fibers 22 or fibers 22a/22b at their respective lower strength length portions 24 or 24a/24b and/or plastically stretches fibers at lower modulus length portions, if included. This is not to say that the fibers necessarily retract elastically after loading. Indeed, a fuel bladder containing fibers 22 or 22a/22b may plastically deform during a ground impact event, but nonetheless reduce focused fiber failure, containing the fuel.

Figure 6:
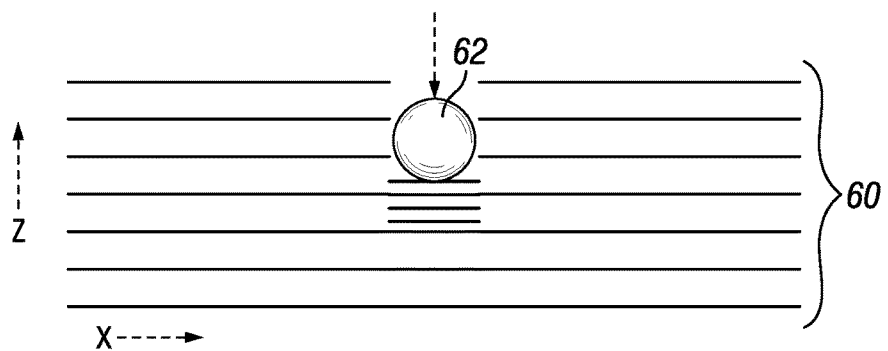
FIG. 6 is a side view of an object impacting a series of plies.

Similar principles apply in mitigating consequences of an object impacting a structure. FIG. 6 shows fibers 60 arranged in a series of plies where the x-direction represents a lateral dimension along the fiber lengths and the z-direction represents the vertical dimension through the thickness of the combined plies. FIG. 6 shows a side view of one fiber in each ply. Object 62 impacts fibers 62 in the through-thickness direction, or vertical dimension. FIG. 6 shows that many of fibers 60 failed during the impact of object 62 and were sheared ahead of object 62 as it traveled into the thickness.

The shearing of fibers 60 absorbs some of the kinetic energy of object 62 and helps to avoid breach of a structure by object 62. Even so, avoiding breach requires a greater mass of fibers and matrix compared to the methods and apparatuses described herein. Known damage resistant structures are made using mostly composites with a single type of fiber in a simple cross-plied layup. These layups might stop an object through mechanisms similar to those described herein, but the extent and location of the different mechanisms is not controlled. The methods and apparatuses herein provide a way of causing fiber separation, in-plane and inter-ply delaminations, and shear failures at specific locations as well as influencing the shape of deformations as a breach resistant structure slows an impacting object. While such structures resist breach, they do not necessarily resist damage. By distributing the load through deformations and shear failures at desired locations and in desired modes, the structure may be more efficient and, thus, lighter in comparison to known structures without such features.

Figure 8:
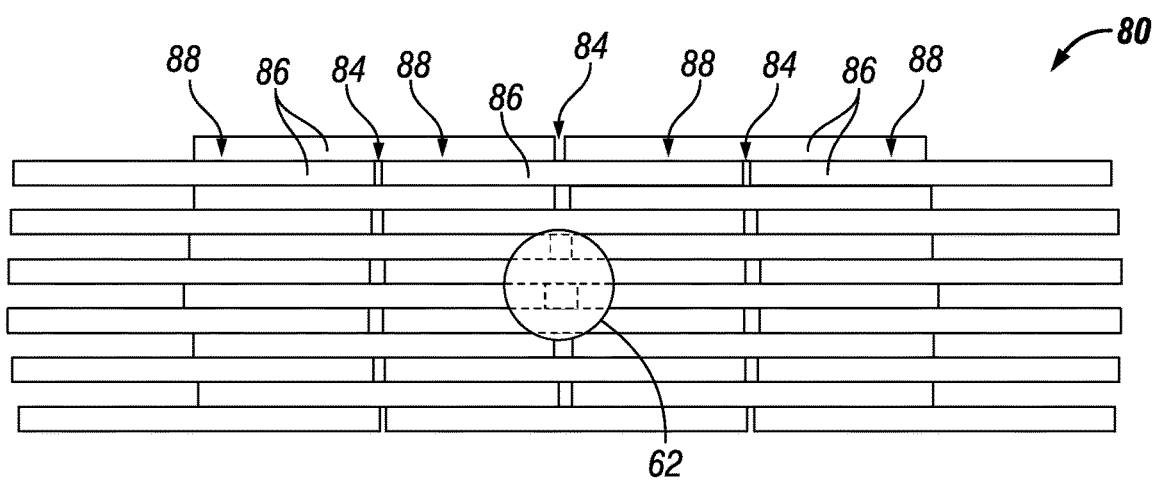
FIG. 8 is a top view of an object impacting the composite ply of FIG. 7.

FIGS. 3 and 5 show how load might be distributed when outward pressure is applied (see FIG. 1) at the bottom of a fuel bladder during an impact with the ground. FIG. 8 shows a more focused impact such as when object 62 impacts fibers. FIG. 7 shows a top view of a ply 70 with lower strength length portions 74. Individual fibers of ply 70 are not apparent in FIG. 7 since they are encapsulated in matrix material. Although lower strength length portions 74 may be created using a variety of processes described herein, FIG. 7 shows lower strength length portions as cuts through individual fibers or groups of fibers and through matrix material.

FIG. 8 shows a top view of ply 70 from FIG. 7 after impact by object 62 represented as a ply 80. In FIGS. 3 and 5, gaps open after application of tensile loading. In FIG. 8, the distributed load applied by the kinetic energy of object 62 separates fibers at lower strength length portions 74 and creates gaps 84 in ply 80. The separation of fibers at length portions 74 and shear between fibers creates shear boundaries 88 apparent in the matrix material. With gaps 84 and shear boundaries 88, segments 86 containing higher strength length portions of the fibers become apparent. As with segments in FIGS. 3 and 5, segments 86 may be individual fibers or contain groups of fibers. In practice, difficulty may exist in cutting individual fibers without cutting adjacent fibers.

Notably, gaps 84 closest to the impact of object 62 separate to a greater degree than gaps 84 at a distance from the impact. Nonetheless, FIG. 8 makes apparent the distribution of the load applied by the kinetic energy. The distributed separations also distribute shear boundaries 88 across ply 80. The pattern of gaps 84 and shear boundaries 88 assist in more gradually decelerating the impact of object 62. Lower modulus length portions (not shown) may be used instead of all or some of the lower strength length portions in FIGS. 7 and 8 in an analogous manner to that discussed above with regard to FIGS. 2 and 3.

Figure 9:
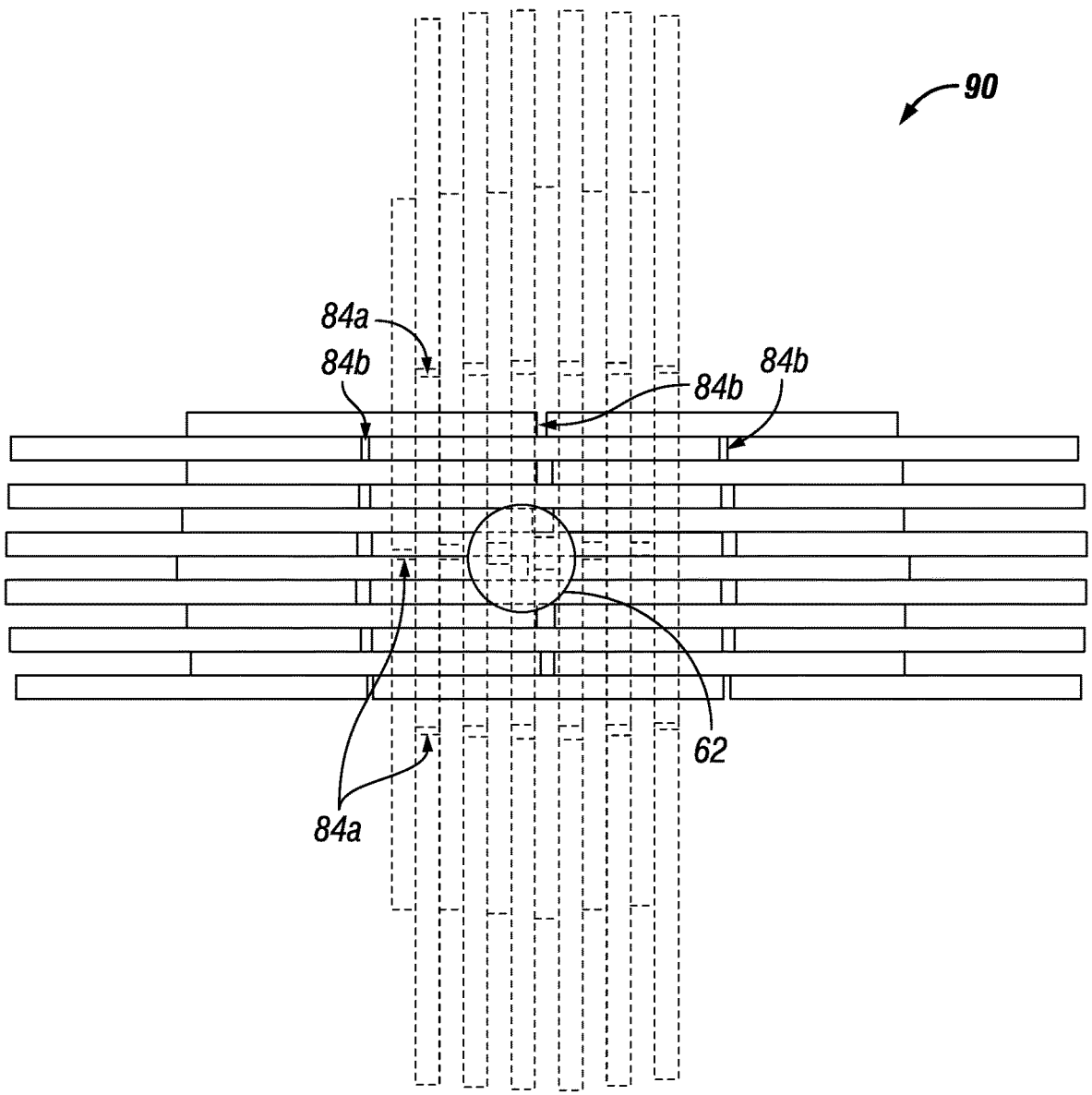
FIG. 9 is a top view of an object impacting two composite plies.

FIG. 9 shows a top view of two plies 90. In appearance, another ply like that in FIG. 7 is rotated 90° and ply 70 is overlaid on top of the rotated ply. FIG. 9 shows a top view of object 62 impacting plies 90. The same gaps, segments, and shear boundaries as shown in FIG. 8 are apparent in the bottom ply of plies 90, but are shown with hidden lines where overlaid and most are not identified with reference numerals for simplicity. The top ply of plies 90 includes the same gaps, segments, and shear boundaries rotated 90° and most are not identified with reference numerals for simplicity. However, FIG. 9 shows gaps 84a that open at separations in fibers in the bottom ply and gaps 84b that open at separations in fibers of the top ply.

It should be appreciated that FIG. 9 is a partial view of full sheets of material that would exist in a composite ply. The most active regions of such sheets are shown in FIG. 9 where the majority of load distributes through fiber separations and matrix shearing. Ply orientations at other angles may also be used as discussed above for FIG. 4. In a composite with multiple plies at different orientations, shear may occur between plies, absorbing additional kinetic energy. Notably, gaps in FIG. 9 open in two different directions. Accordingly, shear between segments of the two plies allows motion that relieves this stress applied by the force of impacting object 62 and creates shear boundaries. Shearing in-plane as well as between plies further distributes energy for greater absorption. Lower modulus length portions (not shown) may be used instead of all or some of the lower strength length portions in FIG. 9 in an analogous manner to that discussed above with regard to FIGS. 2 and 3.

With the use of various types of fiber and matrix resin, the performance of ply 80 may be further controlled. For example, segments 86 may have different properties, such as stiffness, modulus, and strength, and the encapsulating matrix may have different properties, such as matrix adhesion, modulus, ductility, and strength. Consequently, the creation of gaps and the formation of shear boundaries may be different than shown in FIG. 8 when the properties of fibers and/or matrix material vary across ply 80. The same is true when the properties of fibers and matrix material vary across plies 30, 50, or 90.

In the context of the present document, "adhesion" refers to a widely-known property describing the tendency of surfaces to cling to one another. Also, "ductility" refers to a widely-known property wherein a material plastically deforms before failing, as contrasted with brittle materials. In some systems, ductility may be quantified as the percent elongation at failure. Further, "strength" refers to the ability of a material to avoid failure while withstanding an applied stress. In some systems, strength may be quantified as the ultimate tensile strength, meaning the maximum engineering (i.e., nominal) stress of the stress-strain curve. Still further, "modulus" (i.e., "elastic modulus") describes the ability of a material to resist elastic deformation. In some systems, modulus may be quantified as the slope of the stress-strain curve in the elastic region. Adhesion, ductility, strength, and modulus may be measured by a variety of techniques known to those of ordinary skill.

Figure 10:
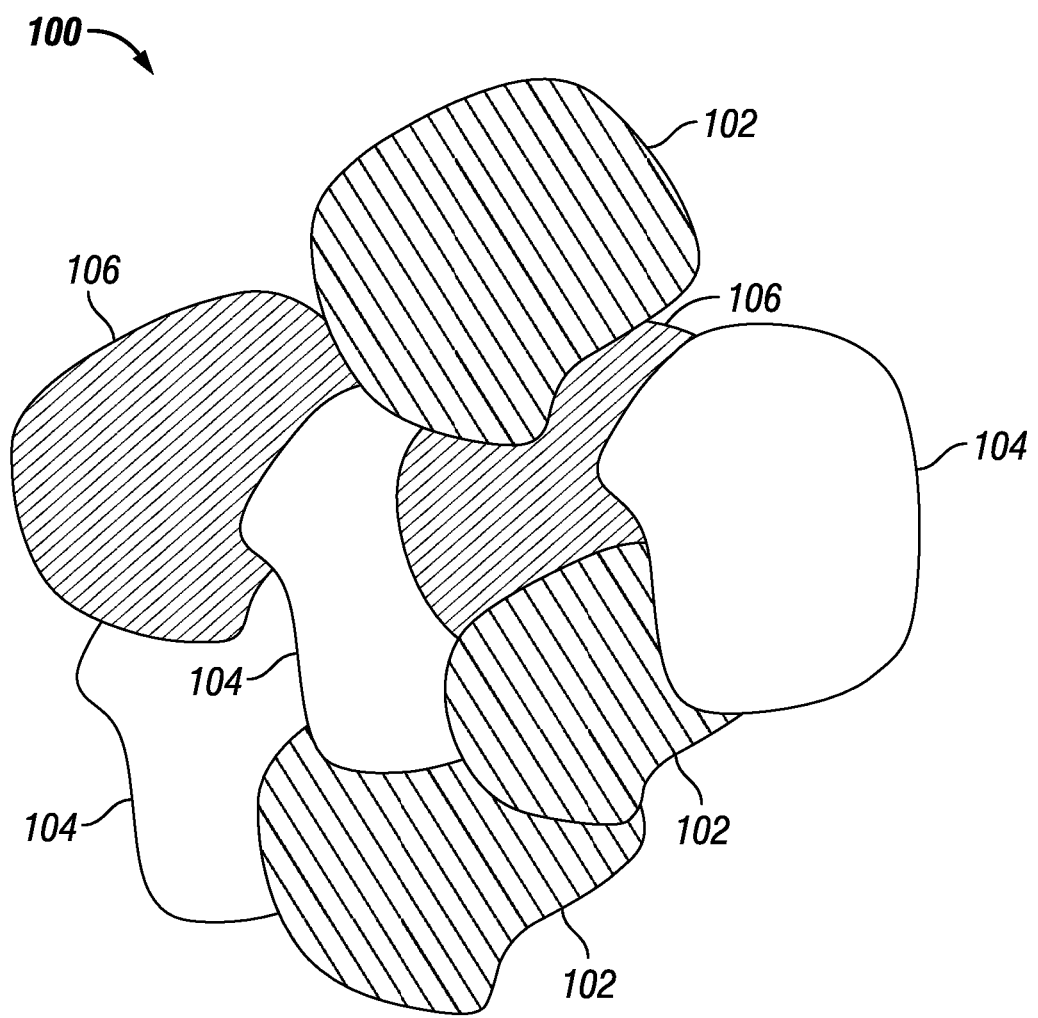
FIG. 10 is a partial, cutaway top view of pieces of composite plies.

FIG. 10 provides an example of applying similar principles wherein an article 100 includes at least three different pieces of composite. FIG. 10 shows a partial, cutaway top view of composite 102, composite 104, and composite 106. The three pieces of composite may vary in size, shape, and properties, such as modulus, fiber type, matrix resin type, matrix resin quantity, fiber direction, etc. Selection of properties and location designation of composite 102, composite 104, and composite 106 may be used with overlapping of the selected composites to control failure modes and absorb considerable amounts of kinetic energy. Given the different sizes, shapes, and properties, the shear between pieces of composite will differ pursuant to the implemented design controls. As the matrix material or adhesive between plies shears due to juxtaposition of pieces with different sizes, shapes, and properties, greater energy absorption through shearing becomes possible.

Behavior of a composite article may be described in three general categories. First, impact of an object results in no plastic deformation with loads absorbed through the strength and resilience of the structure. Second, object impact produces plastic deformation, but not breach of the structure. Third, object impact produces both plastic deformation and breach. The methods and apparatuses herein apply to the latter two categories. Significant explanation exists herein regarding avoiding breach by distributing loads applied from the kinetic energy of an impacting object. However, even though loads are distributed according to the methods and apparatuses herein, the possibility exists for breach when the distributed load nonetheless exceeds the strength of the materials.

Figure 11A:
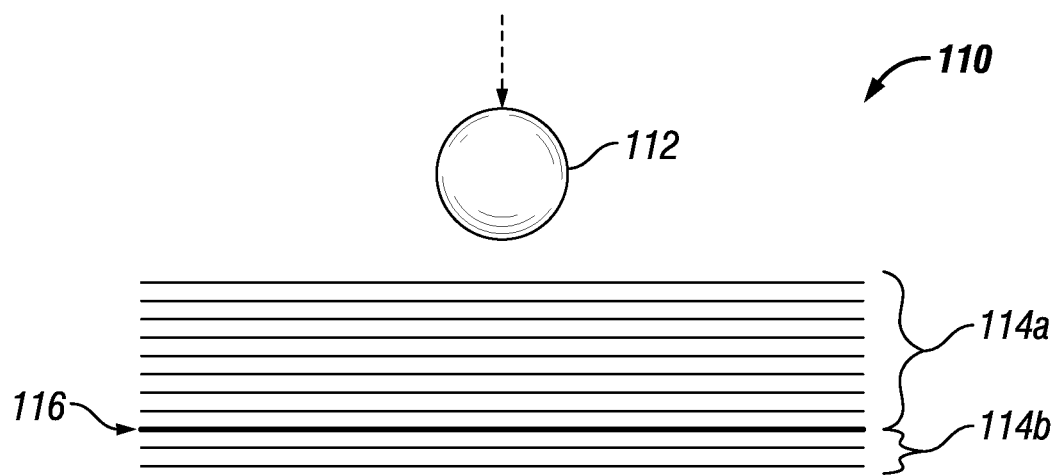
FIGS. 11A, 11B, and 11C are sequential side views of an object impacting a series of layers.
Figure 11B:
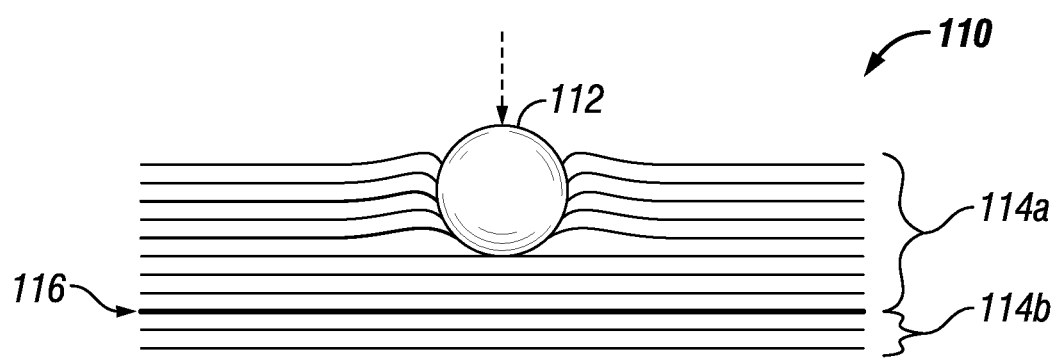
Figure 11C:
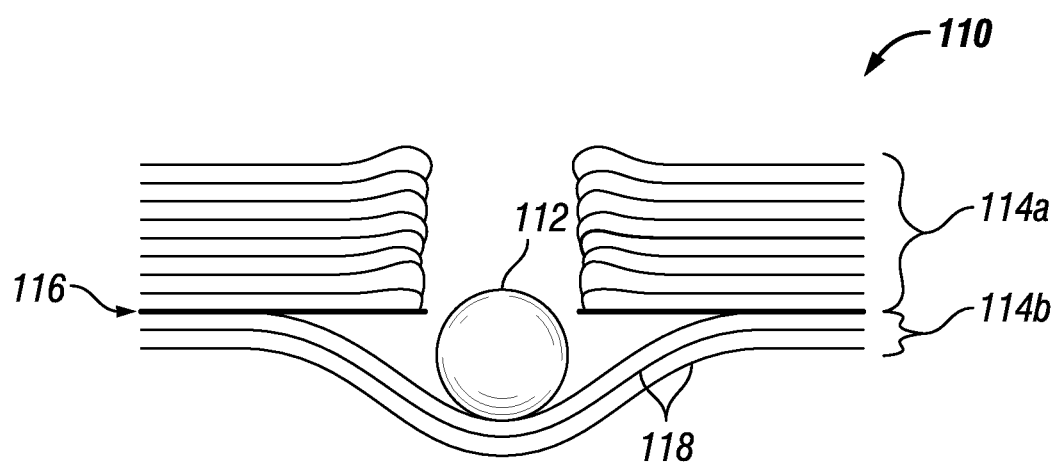

Consequently, FIGS. 11A, 11B, and 11C explain an additional measure that may be used in conjunction with the other methods and apparatuses described herein. In FIG. 11A, a composite 110 includes layers 114a/114b, which may be individual plies or groups of plies, about to be impacted by object 112. Composite 110 includes frontside layers 114a designated apart from backside layers 114b by a design boundary 116. A region of reduced adhesion may exist at design boundary 116, or frontside layers 114a and backside layers 114b may perform differently, or both. FIG. 11B shows object 112 impacting frontside layers 114a and traveling through them. In FIG. 11B, the methods and apparatuses described herein for distributing the load from the force of the kinetic energy from object 112 may be utilized. For example, layers 114a, 114b, or both may include multiple lower strength length portions, multiple lower modulus length portions, or both.

In the event that the load distribution is insufficient to stop object 112, FIG. 11C shows backside layers 114b becoming catching layers 118 as they delaminate and release from contact with frontside layers 114a. By controlling the release properties at design boundary 116 with a region of reduced adhesion, backside layers 114b may be released, enabling various energy absorption mechanisms. For example, shearing the region of reduced adhesion absorbs kinetic energy. Also, the shear performance between backside layers 114b as it becomes catching layers 118 can be controlled to allow shearing between such layers. The shearing between catching layers 118 promotes free movement of catching layers 118 and additionally absorbs kinetic energy. As a result, breach of the structure may be avoided by relying on a mechanism in addition to load distribution and other methods and apparatuses herein.

Alternatively, or in addition, a load distribution concept from the methods and apparatuses herein may be incorporated into backside layers 114b to produce catching layers 178. As one example, frontside layers 174a firstly impacted by an object might have a lower overall failure strain such that their failure absorbs additional kinetic energy while backside layers 114b secondly impacted avoid failure with a higher overall failure strain. Object impact may thus release backside layers 114b, becoming catching layers 178. The firstly impacted fibers, the secondly impacted fibers, or both may include multiple lower strength length portions, multiple lower modulus length portions, or both that vary as a function of location through the thickness to establish the lower and higher overall failure strain. Accordingly, kinetic energy absorption may differ as a function of location as well.

A variety of known methods for making the apparatuses described herein may be used. Modification of known methods may be implemented in order to provide lower strength length portions and/or lower modulus length portions distributed to selected locations identified in a ply. Pursuant to FIG. 7, degradations producing lower strength length portions and/or lower modulus length portions may be applied with thermal, chemical, irradiation, or mechanical processes after a ply is formed or after lay-up of multiple plies. It is additionally conceivable that fibers with a pattern of lower strength length portions and/or lower modulus length portions distributed along fiber lengths may be used according to known methods to fabricate plies. As a result of the designated pattern of lower strength length portions and/or lower modulus length portions in the initial fibers, various possibilities exist for distributing such length portions across a ply according to a designated pattern.

One design consideration includes selecting a lateral and/or thickness region of a composite for implementing the lower strength length portions and/or lower modulus length portions. That is, implementation of the weakened or discontinuous fibers and/or degraded fibers may be beneficially heterogeneously applied throughout a composite article, whether within a ply, ply-to-ply, or otherwise across lateral and/or thickness regions. The distance between lower strength length portions and the length of the lower strength portions may vary and be selected to yield designed deformation patterns. Likewise, the distance between lower modulus length portions and the length of the lower modulus length portions may vary and be selected to yield designed deformation patterns. Other pattern considerations for designating location for lower strength length portions and/or lower modulus length portions may govern global deformation patterns. Therefore, energy absorption may be controlled as a function of location in the composite article.

According to one embodiment, a kinetic energy absorption method includes providing a composite article including a ply containing multiple substantially parallel fibers having inherent failure strains and having inherent moduli. A matrix material at least partially encapsulates the ply. The ply includes multiple lower strength length portions or multiple lower modulus length portions. The multiple lower strength length portions are distributed along individual fibers of the multiple fibers and have failure strains less than the inherent failure strains. The multiple lower modulus length portions are distributed along individual fibers of the multiple fibers and have moduli less than the inherent moduli. A designated pattern of the lower strength length portions or of the lower modulus length portions is distributed to selected locations identified in the ply.

The present method includes distributing a load across the designated pattern when the ply receives a force from kinetic energy above a separation threshold. The load distribution includes plastically deforming the ply and the matrix material and separating the multiple fibers at the lower strength length portions or plastically stretching the multiple fibers at the lower modulus length portions. The load distribution also includes creating gaps in the ply where the multiple fibers are separated or creating shear boundaries in the ply where the multiple fibers are plastically stretched.

Additional features may be implemented in the present article. By way of example, the ply may be a first ply, the multiple fibers may be multiple first fibers, and the designated pattern may be a first designated pattern. Thus, the composite article may further include a second ply containing multiple substantially parallel second fibers having inherent failure strains and oriented not to be substantially parallel to the multiple first fibers of the first ply. The matrix material may further at least partially encapsulate the second ply. The second ply may include multiple lower strength length portions or multiple lower modulus length portions.

The multiple lower strength length portions may be distributed along individual second fibers of the multiple second fibers and have failure strains less than the inherent failure strains of the multiple second fibers. The multiple lower modulus length portions may be distributed along individual second fibers of the multiple second fibers and have moduli less than the inherent moduli. A second designated pattern of the lower strength length portions or of the lower modulus length portions may be distributed to selected locations identified in the second ply. Accordingly, the method may further include distributing a load across the second designated pattern when the second ply receives the force from kinetic energy above the separation threshold. The distribution includes plastically deforming the second ply and the matrix material and separating the multiple second fibers at the lower strength length portions or plastically stretching the multiple fibers at the lower modulus length portions. Gaps are created in the second ply where the multiple second fibers are separated or shear boundaries are created in the ply where the multiple fibers are plastically stretched. The second designated pattern may be same or different from the first designated pattern.

As another example, the multiple fibers may be multiple first fibers and the inherent failure strains may be first inherent failure strains. Thus, the composite article may further include the ply further containing multiple substantially parallel second fibers having second inherent failure strains different from the first inherent failure strains. The multiple lower strength length portions may be further distributed along individual fibers of the multiple second fibers.

The inherent failure strain may be the same for the individual fibers of the multiple fibers. The matrix material may also at least partially join together the multiple fibers into joined fibers. The gaps may separate across a longitudinal direction of the joined fibers to form separated segments of the joined fibers extending between the gaps. The inherent failure strain may be the same for the individual fibers of the joined fibers in the separated segments. The distribution of the load may further include shearing the matrix material between parallel separated segments, between the ply and other plies of the article, or both.

The gaps may separate along a longitudinal direction of the fibers to form split ribbons from the lower strength portions. Accordingly, the distribution of the load may further include shearing the matrix material around the split ribbons, between the ply and other plies of the article, or both.

Providing the composite article may include, before or after forming the ply, reducing failure strains of selected length portions of the multiple fibers to below their inherent failure strains to form the multiple lower strength length portions. Then, as one option, the reduction of failure strains may include, after forming the ply, cutting completely through the selected length portions so that their failure strains are zero to arrive at the designated pattern of the lower strength length portions. As another option, the reduction of failure strains may include, before or after forming the ply, degrading the selected length portions by at least one process selected from among thermal, chemical, irradiation, and partial cutting processes so that their failure strains are greater than zero, but less than their inherent failure strains, to arrive at the designated pattern of the lower strength length portions.

In the composite article, the ply may be a backside ply and the article may further comprise a frontside ply and a region of reduced adhesion separating the frontside ply from the backside ply. Or, the article may further comprise a frontside ply having an overall failure strain lower than an overall failure strain of the backside ply. Or, both the region of reduced adhesion and the different overall failure strains may be used. The load distribution may further include applying the load with an object having kinetic energy and catching the object with the backside ply after it passes through the frontside ply.

The additional features that may be implemented in the present method may also be implemented in other embodiments herein.

In another embodiment, a kinetic energy absorptive composite article includes a ply containing multiple substantially parallel fibers and a matrix material at least partially encapsulating the ply. Multiple lower strength length portions are distributed along each individual fiber of the multiple fibers or multiple lower modulus length portions are distributed along each individual fiber of the multiple fibers. The composite article includes multiple higher strength length portions or multiple higher modulus length portions. Multiple higher strength length portions are distributed along each individual fiber of the multiple fibers, the higher strength length portions of individual fibers being defined by and extending between two respective lower strength length portions of the same fiber and the lower strength length portions having failure strains less than a failure strain of the higher strength length portions that is the same among the higher strength length portions. Multiple higher modulus length portions are distributed along each individual fiber of the multiple fibers, the higher modulus length portions being defined by and extending between two respective lower modulus length portions of the same fiber and the lower modulus length portions having moduli less than a modulus of the higher modulus length portions that is the same among the higher modulus length portions. A designated pattern of the lower strength length portions or of the lower modulus length portions is distributed to selected locations identified in the ply. A corresponding designated pattern of the higher strength length portions or of the higher modulus length portions is defined by the designated pattern of the lower strength length portions or of the lower modulus length portions.

Additional features may be implemented in the present article. By way of example, the lower strength length portions may constitute degradations in the multiple fibers and their failure strains may be greater than zero, but less than the failure strain of the higher strength length portion. The degradations may include at least one process selected from among thermal, chemical, irradiation, and partially cut degradations.

The ply may be a first ply and the multiple fibers may be multiple first fibers. The composite article may further include a second ply of the same construction as the first ply except containing multiple substantially parallel second fibers oriented not to be substantially parallel to the multiple first fibers of the first ply. The matrix material may further at least partially encapsulate the second ply.

The multiple fibers may be multiple first fibers and the multiple higher strength length portions may be multiple first higher strength length portions. The composite article may further include the ply further containing multiple substantially parallel second fibers of the same construction as and parallel to the multiple first fibers except for multiple second higher strength length portions having failure strains different from the failure strains of the multiple first higher strength length portions.

As an additional measure, the ply may be a backside ply and the article may further comprise a frontside ply and a region of reduced adhesion separating the frontside ply from the backside ply. Or, the article may further comprise a frontside ply having an overall failure strain lower than an overall failure strain of the backside ply. Or, both the region of reduced adhesion and the different overall failure strains may be used.

The additional features that may be implemented in the present article may also be implemented in other embodiments herein.

In a further embodiment, a kinetic energy absorptive composite article includes a ply containing multiple substantially parallel fibers and a matrix material at least partially encapsulating the ply and at least partially joining together the multiple fibers into joined fibers. A first lower strength length portion of the joined fibers or a first lower modulus length portion of the joined fibers is at a selected first location identified in the ply. A second lower strength length portion of the joined fibers or a second lower modulus length portion of the joined fibers is at a selected second location identified in the ply and separated from the first location. A higher strength length portion of the joined fibers or a higher modulus length portion of the joined fibers extends from the first location to the second location. The higher strength length portion has a failure strain greater than respective failure strains of both the first and second lower strength length portions, or the higher modulus length portion has a modulus greater than respective moduli of both the first and second lower modulus length portions.

Additional features may be implemented in the present article. By way of example, the first and second lower strength length portions may constitute cuts completely through the joined fibers and their failure strains may be zero. Instead, the first and second lower strength length portions may constitute degradations in the joined fibers and their failure strains may be greater than zero, but less than the failure strain of the higher strength length portion.

The article may be configured so that application of a force from kinetic energy to the higher strength length portion above a separation threshold plastically deforms the ply and the matrix material, separates the fibers at both the first and second locations, and creates a separated segment containing the higher strength length portion. The segment then has a length no less than the higher strength length portion and no greater than combined lengths of the higher strength length portion and the first and second lower strength length portions. In such case, the separation may create a first gap in the ply at the first location and a second gap in the ply at the second location. The segment may be further defined by shears in the matrix between the higher strength length portion and other fibers of the ply, between the ply and other plies of the article, or both.

The joined fibers may include a series of additional lower strength length portions at selected additional locations identified in the ply and separated from the first and second locations and a series of additional higher strength length portions defined by the additional locations of the additional lower strength length portions. A designated pattern of the lower strength length portion and additional lower strength length portions may be distributed to selected locations identified in the ply. A corresponding designated pattern of the higher strength length portion and additional higher strength length portions may be defined by the designated pattern of the lower strength length portion and additional lower strength length portions.

The article may be configured so that application of a force from kinetic energy to the higher strength length portion and the additional higher strength length portions above a separation threshold plastically deforms the ply and the matrix, separates the fibers at both the first and second locations and at the additional locations, and creates a series of separated segments containing the higher strength length portion and the additional higher strength length portions.

The additional features that may be implemented in the present article may also be implemented in other embodiments herein.

The inventors expressly contemplate that the various options described herein for individual methods and apparatuses are not intended to be so limited except where incompatible. The features and benefits of individual methods herein may also be used in combination with apparatuses and other methods described herein even though not specifically indicated elsewhere. Similarly, the features and benefits of individual apparatuses herein may also be used in combination with methods and other apparatuses described herein even though not specifically indicated elsewhere.

In compliance with the statute, the embodiments have been described in language more or less specific as to structural and methodical features. It is to be understood, however, that the embodiments are not limited to the specific features shown and described. The embodiments are, therefore, claimed in any of their forms or modifications within the proper scope of the appended claims appropriately interpreted in accordance with the doctrine of equivalents.

What is claimed is:

1. A kinetic energy absorptive composite article comprising:
   a ply containing multiple substantially parallel fibers, wherein each of the multiple substantially parallel fibers is partitioned into multiple first portions and multiple second portions that are alternately distributed along each of the multiple substantially parallel fibers, wherein a failure strain of each of the first portions is less than a failure strain of each of the second portions or a modulus of each of the first portions is less than a modulus of each of the second portions, wherein the first portions are arranged in a designated pattern at select locations in the ply, and wherein the second portions are arranged in a corresponding designated pattern defined by the designated pattern of the first portions; and
   a matrix material at least partially encapsulating the ply.

2. The article of claim 1 wherein the first portions constitute degradations in the multiple substantially parallel fibers and wherein their failure strains are greater than zero, but less than the failure strain of the second portions.

3. The article of claim 1 wherein the ply is a first ply, the multiple substantially parallel fibers are multiple substantially parallel first fibers, and the composite article further comprises:
   a second ply including multiple substantially parallel second fibers that are not substantially parallel to the multiple substantially parallel first fibers of the first ply; and
   the matrix material further at least partially encapsulating the second ply.

4. The article of claim 1 wherein the multiple fibers are multiple first fibers the ply further including multiple substantially parallel second fibers parallel to the multiple first fibers, wherein each of the multiple substantially parallel second fibers is partitioned into multiple third portions and multiple fourth portions that are alternately distributed along each of the multiple substantially parallel second fibers, wherein a failure strain of each of the third portions is less than a failure strain of each of the fourth portions and wherein the third portions have failure strains different from the failure strains of the multiple first portions.

5. The article of claim 1 wherein the ply is a backside ply and the composite article further comprises a frontside ply and a region of reduced adhesion separating the frontside ply from the backside ply, or the composite article further comprises a frontside ply having an overall failure strain lower than an overall failure strain of the backside ply, or both.

6. A kinetic energy absorptive composite article comprising:
   a ply containing multiple substantially parallel fibers; and
   a matrix material at least partially encapsulating the ply and at least partially joining together the multiple substantially parallel fibers into joined fibers, wherein the joined fibers are partitioned into at least a first portion at a first location identified in the ply, a second portion at a second location identified in the ply, and a third portion extending from the first portion to the second portion along the joined fibers, wherein a failure strain of the first portion and the second portion is less than a failure strain of the third portion or a modulus of the first portion and the second portion is less than a modulus of the third portion.

7. The article of claim 6 wherein the first and second portions include cuts completely through the joined fibers and their failure strains are zero.

8. The article of claim 6 wherein the first and second portions include degradations in the joined fibers and their failure strains are greater than zero, but less than the failure strain of the third portion.

9. The article of claim 6 wherein the article is configured so that application of a force from kinetic energy to the third portion above a separation threshold plastically deforms the ply and the matrix material, separates the multiple substantially parallel fibers at both the first and second locations, and creates a separated segment including the third portion, the separated segment then having a length no less than a length of the third portion and no greater than combined lengths of the first portion, the second portion, and the third portion.

10. The article of claim 6 wherein the joined fibers comprise:
    a series of first additional portions at selected additional locations identified in the ply and separated from the first and second locations; and
    a series of second additional portions defined by the additional locations of the first additional portions, wherein the first portion, the second portion, and the first additional portions are arranged in a designated pattern at select locations in the ply, and wherein the third portion and the second additional portions are arranged an a corresponding designated pattern defined by the designated pattern of the first portion, the second portion, and the first additional portions.

11. A kinetic energy absorptive composite article comprising:
    a ply containing multiple substantially parallel fibers, wherein each of the multiple substantially parallel fibers is partitioned into at least a first portion, a second portion, and a third portion distributed along each of the multiple substantially parallel fibers, the third portion defined between the first portion and the second portion, wherein a failure strain of the first portion and the second portion is less than a failure strain of the third portion; and a matrix material at least partially encapsulating the ply.

12. The article of claim 11, wherein the first portion and the second portion include degradations of the multiple substantially parallel fibers.

13. The article of claim 12, wherein the degradations include thermal, chemical, or irradiation degradations.

14. The article of claim 11, further comprising a second ply including multiple substantially parallel second fibers, wherein the second ply is overlaid with the ply such that the multiple substantially parallel second fibers are at an angle relative to the multiple substantially parallel fibers of the ply, wherein the matrix material at least partially encapsulates the second ply.

15. The article of claim 14, wherein the multiple substantially parallel second fibers are at a 90-degree angle relative to the multiple substantially parallel fibers.

16. The article of claim 11, wherein each of the multiple substantially parallel fibers is further partitioned into first additional portions and second additional portions, the second additional portions defined between the first additional portions, wherein a failure strain of the first additional portions is less than a failure strain of the second additional portions.

17. The article of claim 16, wherein the first portion, the second portion, and the first additional portions are arranged in a designated pattern at select locations in the ply, and wherein the third portion and the second additional portions are arranged in a corresponding designated pattern defined by the designated pattern of the first portion, the second portion, and the first additional portions.

18. The article of claim 11 wherein the ply is a backside ply and the composite article further comprises a frontside ply and a region of reduced adhesion separating the frontside ply from the backside ply.

19. The article of claim 11, wherein the ply is a backside ply and the composite article further comprises a frontside ply having an overall failure strain lower than an overall failure strain of the backside ply.

20. The article of claim 11, applied to an aircraft or spacecraft.

* * * * *